United States Patent Office 3,133,953
Patented May 19, 1964

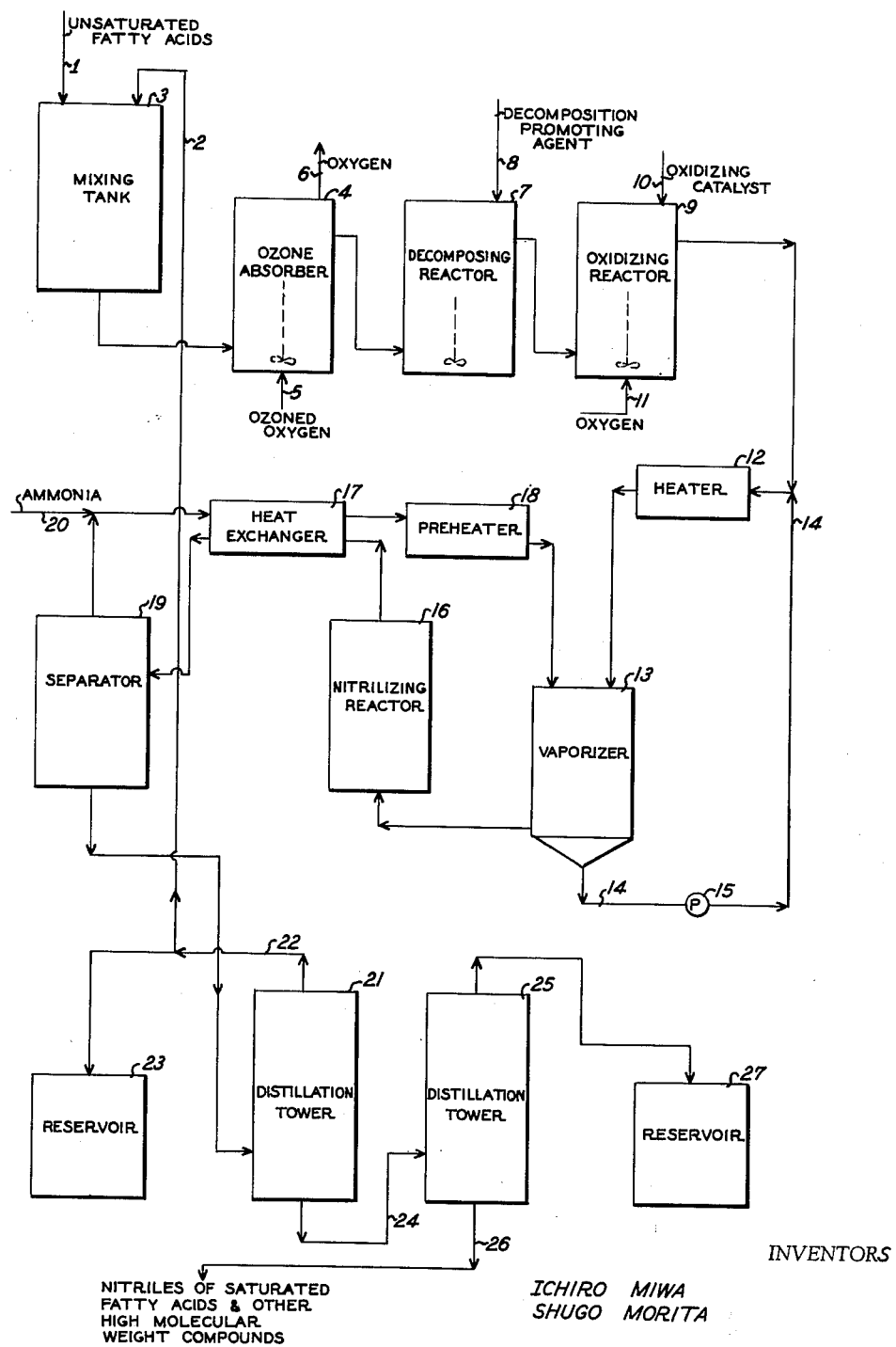

3,133,953
PROCESS FOR THE PRODUCTION OF
ALIPHATIC DINITRILE
Ichiro Miwa and Shugo Morita, Hokkaido, Japan, assignors to Toyo Koatsu Industries, Inc., Tokyo, Japan, a corporation of Japan
Filed Apr. 8, 1960, Ser. No. 20,910
Claims priority, application Japan Oct. 8, 1959
6 Claims. (Cl. 260—465.2)

This invention relates to systems and processes for the production of aliphatic nitriles, and particularly to such systems and processes wherein an unsaturated fatty acid or derivative, such as, oleic acid, linoleic acid, tall oil fatty acid, rice bran oil fatty acid, nitriles thereof or amides thereof, is ozonized and the resulting ozonide decomposed, oxidized and then nitrilized without separation of the formed dibasic and monobasic acids to thus obtain aliphatic dinitriles and aliphatic mononitriles. More particularly still, this invention relates to systems and processes wherein the ozonization of the unsaturated fatty acid is effected with aliphatic nitriles as solvents.

As a means of preparing dibasic acids such as azelaic acid from an unsaturated fatty acid, United States Patent Number 2,813,113 discloses the ozonization of oleic acid with ozonized oxygen into the ozonide, from which, after being decomposed and oxidized with oxygen, azelaic acid is separated by means of distillation and then further purified with hot water.

Furthermore, as a means of preparing aliphatic dinitrile from dibasic acid, there is known a method of nitrilizing a vapor mixture of, say, adipic acid and ammonia in the presence of silicagel or boron phosphate as catalyst by means of vapor phase reaction and separating by distillation the reaction product formed.

Aliphatic dinitrile can be obtained from the unsaturated fatty acids by a combination of the above methods. However, that method has many drawbacks as mentioned below. First, the manufacturing processes are quite complicated, which means that losses from the separate processes are larger and, consequently, the over-all yield is lower. Second, lower yields of dibasic acid are suffered due to decomposition and polymerization which takes place during distillation of the dibasic acid. Under United States Patent Number 2,813,113, the ozonide which has been formed from the ozonization of oleic acid is so viscous that a solvent such as pelargonic acid which is obtained together with azelaic acid from the ozonolysing of oleic acid must be recirculated to the ozone absorber for the purpose of imparting the needed fluidity. Therefore, to separate azelaic acid from the reaction product, the solvent (e.g., pelargonic acid) must be removed by means of distillation first, and then the azelaic acid must be separated from the residue also by means of distillation. As the boiling point of azelaic acid is 200° C. and that of pelargonic acid is 115° C., even at a reduced pressure of 3 mm. Hg, azelaic acid is bound to be exposed to temperatures above 200° C. for a considerable time in the course of the distillations, during which time decomposition and/or polymerization occurs, thereby resulting in a considerable reduction in yield. Third, since decomposition reactors and oxidizing reactors for the ozonide, as well as the distillation tower, must employ high temperatures, the manufacturing equipment utilized suffers from heavy corrosion. Fourth, of the catalysts used in the prior processes for obtaining aliphatic dinitriles, silicagel is low in activity, whilst boron phosphate is superior in activity but somewhat expensive; hence they are not industrially advantageous.

A principal object of this invention is to provide an improved method for the production of aliphatic nitriles, especially aliphatic dinitriles.

Another object is to provide a system of manufacturing aliphatic nitriles in high yield with minimum loss due to decomposition and/or polymerization.

Still another object is to provide a method of manufacturing aliphatic nitriles at an improved rate, in high yield and with low polymer formation.

The above and other objects of this invention will become apparent from the following description.

The instant invention avoids the above-listed defects of prior art processes and provides a new method of preparing aliphatic dinitriles from unsaturated fatty acids. The system of this invention comprises diluting the unsaturated fatty acids with an aliphatic mononitrile having six to eighteen carbon atoms or a mixture thereof (or with aliphatic nitriles which are obtained as by-products in the production of aliphatic dinitriles by ozonizing, decomposing and subsequently nitrilizing the unsaturated fatty acids), ozonizing them with ozonized oxygen, decomposing the ozonide thus formed with the aid of such decomposition promoting agents, as phosphoric acid or phosphoric acid ester, oxidizing the decomposed ozonide with oxygen in the presence of an oxidizing catalyst into monobasic and dibasic acids, vaporizing the resulting mixture of acids and solvent nitriles while introducing gaseous ammonia, converting the carboxylic acid content of the vapor mixture into aliphatic nitriles in the presence of a catalyst, and finally separating aliphatic dinitriles by fractional distillation of said mixture of nitriles.

We have found that in ozonizing the unsaturated fatty acids, an aliphatic mononitrile having six to eighteen carbon atoms or a mixture thereof (or the aliphatic nitriles that are formed as by-products in the production of aliphatic dinitriles by ozonizing, decomposing and subsequently nitrilizing the unsaturated fatty acids) can be employed as solvent for the purposes of lowering the viscosity of the ozonide formed and for promoting a smooth reaction. The addition of the above solvent nitriles in amounts of 0.5 to 5 times the weight of the unsaturated fatty acid starting materials accomplishes these purposes well. The ozonization can be effected at temperatures between 10° C. and 50° C. without adversely affecting the yield of aliphatic dinitrile.

The following advantages are realized in following the teachings of the present invention: First, the dibasic acid present in the reaction mixture need not be separated by means of distillation and extraction from the monobasic acids and the solvent. They are directly nitrilized and thereafter subjected to distillatory separation. This means the elimination of a most troublesome distillation of the dibasic acids, and also obviating subsequent extraction treatments. In other words, this means a simplification of the processing equipment. Secondly, the aliphatic nitriles are more stable to heat than the corresponding acids. As for boiling points, azelonitrile shows 160° C. at 3 mm. Hg which is 40° C. lower than 200° C. at 3 mm. Hg of azelaic acid, that of pelargonitrile is 20° C. lower than pelargonic acid at 3 mm. Hg. This permits a simpler distillation and higher yields. Hence, less loss through decomposition and polymerization occurs and higher yields of aliphatic dinitrile are obtained. Actually, yield of aliphatic dinitriles based on the unsaturated fatty acid starting materials is increased by 10–15% by the present invention, as against the combination of the heretofore known methods. Thirdly, as aliphatic nitriles are less corrosive and lower in distillation temperature than their corresponding acids, distillatory separation of the nitriles results in less corrosion to the distillation towers and the reactors than where monobasic acid is employed as solvent.

The inventors have also found that the use of phosphoric acids such as orthophosphoric acid, pyrophosphoric acid, metaphosphoric acid, phosphorous acid, polyphosphoric acid and phosphoric acid anhydride, as well as phosphoric esters such as triethylphosphate, tributyl phosphate, trioctylphosphate, tricresylphosphate, ethyl metaphosphate, butyl pyrophosphate, and octyl phosphite, as decomposition promoting agents in decomposing the ozonides, obtained by the ozonization of unsaturated fatty acids, leads to an increase in the rate of ozonide decomposition. That is, the rate of ozonide decomposition at 80–120° C. where a single agent or a mixture thereof selected from the phosphoric acids or phosphoric esters lisited above is added in amount of 0.01–10% by weight of the unsaturated acids being ozonized, increases about 10% over the rate of decomposition when no such agent is used. Use of any single agent or a mixture thereof selected from the above groups has not demonstrated any significant detriment. Inasmuch as the decomposition promoting agent acts in the ozonide decomposing stage, addition of it can be made in such a way that either it is initially mixed with the unsaturated fatty acids to be ozonized or it is added to the ozonide along with inorganic or organic acid salts of manganese, iron or cobalt which act as oxidizing catalysts for the aldehydes or semi-aldehydes formed as the decomposed product of the ozonide, and heating the mixture at 80–120° C. with the passage of oxygen therethrough to decompose and oxidize in the same step.

In the nitrilizing process, the mixture of acids and nitriles obtained by the decomposition and oxidation of the ozonide is heated to 150° C.–200° C. in a heater, and thereafter conducted to the top part of a vaporizer filled with Raschig rings while ammonia which has been heated to 400–420° C. is introduced at the top part of the vaporizer in a descendent flow acting to vaporize said mixture. In this instance, unvaporized substances are coincidentally formed and are withdrawn from the bottom of the vaporizer, cooled, recycled to the heater and thence back to the top of the vaporizer. In this manner the vaporizer has been operated without the monobasic and dibasic acids present in the unvaporized substances polymerizing to high molecular weight substances to result in an amelioration of yield of aliphatic nitriles and without clogging of the vaporizing zone of the vaporizer.

As for a catalyst in the presence of which said vapor mixture is converted to aliphatic nitriles, the combination of molybdic acid or vanadic acid or both with phosphoric acid has been found to be excellent in activity and economy. Such catalysts are prepared by adding a mixture of molybdic acid or vanadic acid and phosphoric acid as the active promoter to silicagel in an amount of several percents based on the weight of silicagel. Caustic potash in an amount sufficient to maintain the pH of the mixture at 7 or below is added to the mixture of acids. The above acids are adsorbed by the silicagel, or, if desired, water can be added to the acids and the aqueous mixture can be mixed with an active earth and molded. The adsorbed or molded catalysts are dried and then subjected to heat treatment at 300° C. to 350° C. for three to five hours. The nitrilization temperature in the presence of said catalysts is preferably in the range of 320 to 360° C. The application of the above method of vaporizing the mixture of acids and nitriles and the application of the new nitrilization catalyst has secured over 98% yield in aliphatic mononitriles such as capronitrile and pelargonitrile, based on the monobasic acids fed into the vaporizer and over 90% yield in aliphatic dinitrile, based on the dibasic acid fed to the vaporizer.

The process of the present invention will be best understood in relation to the description of the accompanying drawing which is a diagrammatic flow chart indicating the pieces of equipment used and their relationship in the process. The unsaturated fatty acids are introduced at 1 into a mixing tank 3. Into the mixing tank 3 are also introduced the solvent nitriles (mainly aliphatic mononitriles) through 2. The solution formed therein is sent to an ozone absorber 4 to be subjected to ozonization with ozonized oxygen introduced through 5. The ozone absorber 4 is cooled in some suitable way (not shown in the flow-diagram) in order to control the reactions which take place there. In the figure is shown an absorber with an agitator, which may be of the wetted-wall column type, the number of absorbers being suitably selected in view of the absorber capacity, flow rates and other conditions. The oxygen discharged through 6 which also contains a small amount of ozone and organic substances is treated in some suitable way (not shown) to remove the ozone and organic substances therefrom; the oxygen thus treated is recycled to an ozonizer (also not shown). The mixture of the ozonides thus formed in the nitrile solvent is conducted to a decomposing reactor 7, where there is also added a decomposition-promoting agent through 8 and where the ozonides are heated to above their decomposition temperature. The decomposed ozonides are then conducted to an oxidizing reactor 9 into which an oxidizing catalyst is added through 10 and oxygen is introduced through 11 so as to carry out the oxidation of the aldehydes and semi-aldehydes, which are the decomposed products of ozonide, into acids. In the figure, there is shown only one decomposing reactor and one oxidizing reactor. More than one of each, however, can be used, according to desires or circumstances. Furthermore, a modification of the process can be made in such a way as to incorporate the decomposing reactor and oxidizing reactor into one unit and to add both the decomposition-promoting agent and the oxidizing catalyst to ozonides at once, so as to carry out continuously the decomposition and oxidation at a temperature above that of ozonide decomposition. The mixture of monobasic and dibasic acids and the solvent nitriles is passed through a heater 12 to a vaporizer 13 filled with Raschig rings. Coincidentally, ammonia supplied both from an external source 20 and recycled from the separator 19 is passed through the heat exchanger 17 and a preheater 18 where it is heated and conducted to the vaporizer 13, in which a vapor mixture of said acids and nitriles is formed. The vapor mixture is sent to a nitrilizing reactor 16, which is heated and which is filled with a nitrilizing catalyst. The resulting mixture is conducted through the heat exchanger 17 into a separator 19, where it is separated into ammonia gas, a mixture of raw aliphatic nitriles and aqueous ammonia solution. The ammonia gas is recycled to the vaporizer 13 together with newly-fed ammonia from source 20. The remaining, unvaporized substances in the vaporizer 13 are removed through a double-tubular conduit 14 and concurrently cooled. These substances are then recycled by means of a pump 15 to the heater 12.

The liquid portion separated at the bottom of separator 19 comprises a mixture of aliphatic mononitriles and aliphatic dinitriles and aqueous ammonia solution which formed from ammonia gas added in vaporizer 13 and the water produced by the nitrilizing reaction of the acids and ammonia. The mixture is separated into a mixture of aliphatic nitriles and aqueous ammonia, of which said mixture of aliphatic nitriles is conducted to a primary distillation tower 21, wherein aliphatic mononitriles and aliphatic dinitriles with high boiling substances are separated from each other through distillation. The distillate mainly composed of aliphatic mononitriles is passed through conduit 22 to a reservoir 23, from which an amount necessary as a solvent is conducted through conduit 2 into the mixing tank 3. The remaining aliphatic dinitrile and high-boiling substances are conducted through piping 24 into a secondary distillation tower 25, where the aliphatic dinitrile is separated from the high-boiling substances through distillation and collected in a reservoir 27. The high-boiling substances comprising nitriles of saturated fatty acids normally present in unsaturated fatty acid starting materials and other high molecular weight compounds formed during the nitrilizing reaction are withdrawn from the secondary distillation tower 25 through the tap 26.

The following example is presented only by way of illustration of the present invention, the apparatus described above having been employed therein.

*Example 1*

In this example, 50 kgs. of tall oil fatty acid with an acid value of 197 and an iodine value of 139, the composition being 50.5% oleic acid, 46.5% linoleic acid, 2.0% saturated fatty acid, 0.6% rosin acid and 0.4% unsaponified matter, was employed as follows. The tall oil fatty acid was continuously charged into the mixing tank, where it was diluted with a 150 kg. mixture comprising chiefly capronitrile and pelargonitrile, which had been prepared in a previous operation. The mixture thus formed was conducted to the ozone absorber and was ozonized under agitation at a temperature of 30° C. by passing ozonized oxygen with 2% ozone at a rate of 200 l./min. The time of ozonization was 32 hours for every 50 kg. tall oil fatty acid. The ozonide thus formed was sent to the decomposing reactor where it was decomposed under agitation at 100° C. with an addition of 500 g. of 89% orthophosphoric acid as a decomposition-promoting agent. The decomposed product which chiefly consisted of aldehydes and semi-aldehydes was sent to the oxidizing reactor, where the aldehyde content was completely oxidized to caproic acid, pelargonic acid and azelaic acid under agitation at 100° C. in the presence of 10 gr. manganese acetate as oxidizing catalyst and with the aid of oxygen charged at a rate of 200 l./min.

The mixture of the above acids and solvent nitriles was heated to 150° C. in the heater and subsequently it was fed to the upper part of the vaporizer at a rate of 2.1 kg./hour. At the same time, ammonia which had been heated to 420° C. by passage through the heat exchanger and preheater was fed at a rate of 50 l./min. under standard conditions into the top of the vaporizer in descendent flow so as to vaporize the aforementioned mixture to a vapor mixture, which was then conducted along with the ammonia to the nitrilizing reactor, where the acids content present was converted to nitriles. Unvaporized substances formed in the vaporizer were cooled to 100° C. with cooling water while they were passed through a double-tubular conduit and were recycled to the heater by means of a pump. The nitrilization catalyst contained by the nitrilizing reactor had been prepared in the following way: 4 parts of ammonium vanadate were added to 200 parts of water and 37.6 parts of caustic potash. After heating the resulting mixture to eliminate the ammonia content completely, 52 parts of 80% $H_3PO_4$ and an amount of water sufficient to make the whole solution into 1,000 parts were added. The solution thus obtained was then impregnated into 100 parts of silicagel and the impregnated silicagel was dried and heated for 4 hours at 300° C. The mixture of aliphatic nitriles and other substances which left the nitrilizing reactor was passed through the heat exchanger where heat exchange took place between the mixture and the ammonia gas being directed to the preheater and then the mixture was conducted to the separator, where it was separated into a solution comprising a mixture of nitriles and aqueous ammonia solution and ammonia. That portion of ammonia equivalent to the reacted amount was newly furnished and recycled through the heat exchanger and preheater to the vaporizer.

The portion of the mixture of aliphatic nitriles which had been separated from the aqueous ammonia solution was sent to the primary distillation tower operated at 100 mm. Hg pressure wherein 163.9 kg. of a mixture of aliphatic nitriles which comprised mainly capronitrile and pelargonitrile and which had boiling points below 165° C. was separated as distillate and 19.5 kg. of azelonitrile and high boiling point substances were separated as residue. Of the distillate, 150 kg. was originally used as solvent in the ozonizer and 13.9 kg. was obtained as by-product. The distillate was composed of a major portion of capronitrile and pelargonitrile and a slight portion of azelonitrile and malonitrile. The residue which comprised chiefly azelonitrile was conducted to the secondary distillation tower, where it was subjected to distillation at a reduced pressure of 3 mm. Hg to obtain 19.0 kg. of azelonitrile with a boiling point of 159–161° C. The residue in the secondary distillation tower amounted to 0.5 kg., comprising chiefly high molecular weight substances.

What is claimed is:

1. A method for preparing azelonitrile by forming two terminal nitrile groups in place of the double bonds of unsaturated fatty acids selected from the group consisting of oleic acid, linoleic acid and mixtures thereof which comprises the steps of dissolving the unsaturated fatty acids in a nitrile solvent selected from the group consisting of pelargononitrile, capronitrile and mixtures thereof; reacting said unsaturated fatty acids with ozonized oxygen at a temperature from about 10° C. to about 50° C. to form ozonides thereof; cleaving said ozonides in the presence of a reaction promoting agent selected from the group consisting of orthophosphoric acid, pyrophosphoric acid, metaphosphoric acid, phosphorus acid, polyphosphoric acids, phosphoric anhydride, triethylphosphate, tributyl phosphate, trioctyl phosphate, tricresyl phosphate, ethyl metaphosphate, butyl pyrophosphate and octyl phosphite in a decomposing zone, and reacting the products resulting from said cleavage thereof with oxygen at a temperature from about 80° C. to about 120° C. in the presence of an oxidation catalyst to form organic acids selected from the group consisting of monobasic and dibasic acids and mixtures thereof, thereafter contacting said monobasic and dibasic acids with ammonia at a temperature from 320 to 360° C. in a nitrilizing zone to form nitrile groups thereon, thereby producing a mixture of azelonitrile and at least one mononitrile from the group consisting of capronitrile, pelargononitrile and mixtures thereof, and separating azelonitrile from said mixtures.

2. A method for preparing azelonitrile by forming two terminal nitrile groups in place of the double bonds of unsaturated fatty acids selected from the group consisting of oleic acid, linoleic acid and mixtures thereof comprising a first step of dissolving the unsaturated fatty acids in a nitrile solvent selected from the group consisting of pelargononitrile, capronitrile and mixtures thereof; reacting said unsaturated fatty acids with ozonized oxygen at a temperature from about 10° C. to about 50° C. to form ozonides thereof; cleaving said ozonides in the presence of a reaction promoting agent selected from the group consisting of orthophosphoric acid, pyrophosphoric acid, metaphosphoric acid, phosphorus acid, polyphosphoric acids, phosphorous anhydride, triethylphosphate, tributyl phosphate, trioctyl phosphate, tricresyl phosphate, ethyl metaphosphate, butyl pyrophosphate and octyl phosphite in a decomposing zone, and reacting the products resulting from said cleavage thereof with oxygen in the presence of an oxidation catalyst at a temperature from about 80° C. to about 120° C. to form aliphatic organic acids selected from group consisting of monobasic and dibasic acids and mixtures thereof, thereafter contacting said monobasic and dibasic acids with ammonia at a temperature from 320 to 360° C. in a nitrilizing zone to form nitrile groups thereon, thereby producing a mixture of azelonitrile and at least one mononitrile from the group consisting of capronitrile, pelargononitrile and mixtures thereof, separating azelonitrile from said mixture and separating said mononitrile from said mixture and recycling at least a portion of said separated mononitrile for dissolving said unsaturated fatty acid material in accordance with the first step herein set forth.

3. The method as claimed in claim 1 wherein said reaction promoting agent is employed in the range of 0.01% to 10% by weight, based upon the unsaturated fatty acid.

4. The method as claimed in claim 2 wherein the aliphatic organic acids are reacted with ammonia in the presence of a catalyst consisting essentially of molybdic acid and phosphoric acid adsorbed by silicagel.

5. The method as claimed in claim 2 wherein the organic acids are reacted with ammonia in the presence of a catalyst consisting essentially of vanadic acid and phosphoric acid adsorbed on silicagel.

6. The method as claimed in claim 2, wherein the nitrile solvent ranges from 0.5 to 5 times the weight of the unsaturated fatty acid.

References Cited in the file of this patent

UNITED STATES PATENTS

| | | |
|---|---|---|
| 2,042,729 | Ralston et al. | June 2, 1936 |
| 2,292,950 | Loder et al. | Aug. 11, 1942 |
| 2,299,755 | Jolly | Oct. 27, 1942 |
| 2,662,908 | Logan | Dec. 15, 1953 |
| 2,755,301 | Nelson et al. | July 17, 1956 |
| 2,813,113 | Gobel et al. | Nov. 12, 1957 |
| 3,012,060 | Aries | Dec. 5, 1961 |

OTHER REFERENCES

Bergmann: "Acetylene Chemistry," 1948, page 80.

Rodd: "Chemistry of Carbon Compounds," vol. 1, Part A, 1951, page 564.

Rodd: "Chemistry of Carbon Compounds," 1951, vol. 1-A, page 628.